United States Patent [19]
Schmidt

[11] 4,397,479
[45] Aug. 9, 1983

[54] SUPPORTING LEG FOR MOBILE CONSTRUCTIONS

[75] Inventor: Mogens F. Schmidt, Vissenbjerg, Denmark

[73] Assignee: Falck Schmidt Shipping ApS, Odense, Denmark

[21] Appl. No.: 226,541

[22] Filed: Jan. 19, 1981

[30] Foreign Application Priority Data

Jan. 29, 1980 [DK] Denmark ........................ 363/80

[51] Int. Cl.[3] ........................ B60S 9/10; B60P 3/28

[52] U.S. Cl. ........................ 280/764.1; 212/154; 212/189; 340/685

[58] Field of Search ........................ 280/766, 763, 764; 180/271; 254/86 H; 212/189, 154, 150, 149, 155; 200/153 V, 153 A, 52 A; 340/52 H, 685, 689, 665

[56] References Cited

U.S. PATENT DOCUMENTS

| | | | |
|---|---|---|---|
| 3,344,934 | 10/1967 | Boughton | 212/155 |
| 3,680,714 | 8/1972 | Holmes | 212/154 |
| 3,824,578 | 7/1974 | Harders | 340/689 |
| 3,848,750 | 11/1974 | Hoge | 212/154 |
| 4,084,777 | 4/1978 | Lambert | 280/766 |

FOREIGN PATENT DOCUMENTS

| | | | |
|---|---|---|---|
| 53-20222 | 2/1978 | Japan | 340/685 |
| 121173 | 1/1971 | Norway | 280/764 |
| 286169 | 11/1971 | U.S.S.R. | 280/764 |

*Primary Examiner*—David M. Mitchell
*Attorney, Agent, or Firm*—Holman & Stern

[57] ABSTRACT

Supporting leg for mobile construction equipment such as mobile cranes, having a supporting foot (1) which can be elevated and lowered in relation to the foundation by means of a moving mechanism (3) inserted between the equipment (2) and the supporting leg. Wherein the moving mechanism (3) has a clearance (4) between the foot elevated position and the foot lowered position, and a spring (8) urges the mechanism (3) against the elevated position, whereby an alarm switch (9) is activated to give an automatic indication in case the stability of the construction is reduced. The allowable reduction of load on the supporting leg before the activation, can be adjusted by the spring force applied.

2 Claims, 1 Drawing Figure

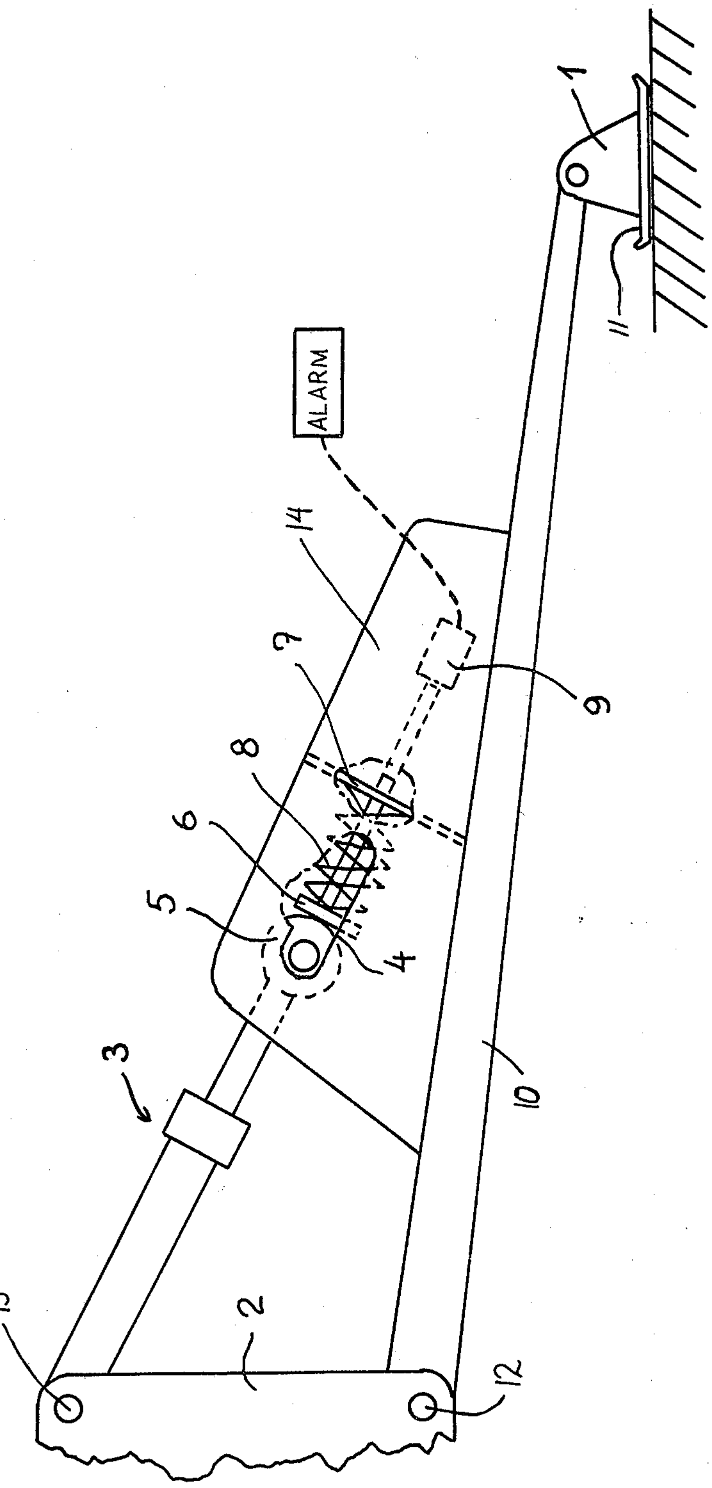
ALARM
1
11
14
7
9
8
6
5
4
3
10
13
2
12

SUPPORTING LEG FOR MOBILE CONSTRUCTIONS

FIELD OF THE INVENTION

The invention relates to a supporting leg for mobile construction equipment and alarm systems therefore.

DESCRIPTION OF THE PRIOR ART

It is known to increase the stability of mobile construction equipment such as cranes during operation by means of supporting legs, or outriggers the feet of which are brought to rest against the foundation farther outside the center of gravity than the ordinary supports of the plant such as e.g. road wheels. With such supporting legs it is also feasible to erect such mobile construction equipment on an uneven or inclined foundation.

BRIEF SUMMARY OF THE INVENTION

The object of the invention is to provide such supporting legs which automatically indicate when the stability of the construction equipment is reduced a predetermined extent.

This is, according to the invention, achieved by providing the supporting legs with a moving mechanism having a clearance between the supporting foot elevated position and the lowered position, a spring between the mechanism and the support leg to urge the mechanism against the foot elevating position, and an alarm device operated by a predetermined reduction in foot pressure.

By this invention a reduced load on the supporting food caused by the mobile construction equipment no longer resting in the desired manner on the supporting leg will induce activation of the alarm switch. How much reduction of the load can safely be allowed before the activation of the alarm is adjusted by means of the selected spring force.

DESCRIPTION OF THE DRAWING

In the following the invention will be described in detail with reference to the accompanying drawing schematically showing a supporting leg with an alarm for mobile construction equipment according to the invention.

DETAILED DESCRIPTION

The drawing shows a supporting leg, or outrigger 10, for construction equipment suspended such a manner on the construction equipment to be supported that a supporting foot 1 at the free end of the leg 10 can be elevated and lowered in relation to the foundation. A plurality of supporting legs are used. The supporting foot 1 is thus pivotably suspended on the end of the leg to allow the contact pad 11 of the foot to rest against the foundation irrespective of the inclination of the foundation and/or supporting leg. The supporting leg 10 is pivotally suspended at 12 on a part 2 of the mobile construction equipment in such a manner that by way of a moving mechanism 3 acting between the equipment and the leg can be swung up and down until the pad 11 of foot 1 will press against the foundation.

The moving mechanism 3, in the embodiment illustrated a cylinder-piston mechanism, having one of its points of connection, in the shown embodiment, pivotally connected at 13 to the part 2 and the other point of connection slidably connected to supporting leg by the outer end 5 of the piston rod being axially displaceable in a slot 4 provided in projection or bracket, 14 on the supporting leg. The end 5 of the piston rod rests against a spring-loaded rod shaped contact arm 6. A spring 8, in the present case a number of disc springs, is positioned between a flange on one end of the contact arm and a stopper 7 an the projection 14 of the supporting leg in such a manner that the flange of arm 6 is pressed against the piston rod end 5. The spring 8 will then tend to keep the end of the piston rod 5 at the left end of the slot 4 as viewed in the drawing.

When the moving mechanism 3 is in the position of squeezing the supporting foot against the foundation, the end of the piston rod 5 will be shifted to the opposite or right end of the slot 4 and the spring 8 will be compressed. The other end of the contact arm 6 will thereby be pressed against an electric switch 9 as shown in phantom. The switch 9 can be a limit switch connected in a suitable circuit (not shown) so that when actuated by arm 6 it disconnects the circuit to an alarm, such as an annunciator, or light, or both. A circuit of a type useable with this invention may be the simplified type shown in U.S. Pat. No. 3,824,578, issued July 16, 1974 to H. G. Harders, except that the switches 9 in the instant invention are normally-closed, being held open by the end of contact arm 6. The specific circuit used is conventional and is not part of this invention, however, any circuit useable with this invention will be readily apparent to a person having ordinary skill in the art.

In use of the invention, if the mobile construction equipment is stable, the pressure exerted against the foundation by the supporting leg will have a given measure for all the supporting legs of the construction. If the pressure in case of one or several supporting legs is reduced, this is an indication of the mobile construction no longer being stable.

If the holding pressure for the shown supporting leg is reduced to a predetermined value, the spring 8 will try to press the foot further down against the foundation by urging the flange on arm 6 against the end 5 of the piston rod, so that the contact arm 6 will no longer press against the electric switch 9. The switch 9 will therefore close the circuit resulting in a signal, warning the operator of the unstable condition. The switch can also be used in a circuit which when energized will arrest further movement of the construction if desired.

The actual moment when the switch 9 will activate the said signal, i.e. the point at which the indication of reduction of the pressure of the supporting foot will take place, can be determined as required by the dimensioning of the spring 8.

The alarm contact arrangement can of course be modified. The contact arm 6 can e.g. be a rocker arm instead of the axially displaceable rod shown. The essential feature of the invention is that the moving mechanism 3 shall have a clearance in the downwards lowering direction of the supporting foot, such as between end 5 of the piston rod and stopper 7 in the embodiment shown, and that the movement of the mechanism in the clearance is controlled in a suitable manner.

I claim:

1. A stabilizing device for mobile construction equipment having a main body comprising at least one elongated leg pivotally attached at one end to the body of the equipment, a foot pivotally attached to the other end of said leg adapted to engage the foundation on which the equipment is setting, a planar bracket projecting from said leg, an elongated slot in said bracket, a piston and cylinder power unit pivotally connected at one end to the body and slidably connected at the other end in said slot, a stopper member mounted on said bracket between said slot and said foot, a contact arm mounted on said bracket between the end of said piston-cylinder connected in said slot and said foot, spring means operably mounted between said stopper and said contact arm to resiliently urge said contact arm into engagement with the end of said piston-cylinder connected in said slot, and alarm switch means operably mounted on said bracket between said contact arm and said foot so that said contact arm engages said switch when a predetermined force is exerted by said foot on said foundation to maintain a stable operating condition for the equipment and said contact arm disengages said switch when said force is reduced a predetermined amount to create an unstable operating condition, said disengagement activating an alarm.

2. A stabilizing device as claimed in claim 1 wherein said piston-cylinder cooperates with said slot to raise and lower said leg about its pivotal connection to the body and provide said predetermined force on said foot, said contact arm is an elongated rod-like member mounted with its longitudinal axis substantially colinear with the longitudinal axis of said piston-cylinder unit, a flange is provided on the end of said connecting arm in engagement with said piston-cylinder end, and said spring means is disposed between said flange and said stopper and has a predetermined spring force which determines said reduced force at the foot which creates said unstable condition.

* * * * *